United States Patent [19]
Zuo

[11] Patent Number: 5,487,508
[45] Date of Patent: Jan. 30, 1996

[54] INJECTION RATE SHAPING CONTROL PORTED CHECK STOP FOR A FUEL INJECTION NOZZLE

[75] Inventor: Lianghe Zuo, Normal, Ill.

[73] Assignee: Caterpillar Inc., Peoria, Ill.

[21] Appl. No.: 380,930

[22] Filed: Jan. 31, 1995

Related U.S. Application Data

[63] Continuation of Ser. No. 220,854, Mar. 31, 1994, abandoned.

[51] Int. Cl.⁶ ................................................. F02M 45/04
[52] U.S. Cl. ................................ 239/533.5; 239/533.9
[58] Field of Search ........................... 239/533.2–533.5, 239/533.9, 88, 89

[56] References Cited

U.S. PATENT DOCUMENTS

| | | | |
|---|---|---|---|
| 4,006,859 | 2/1977 | Thoma | 239/89 |
| 4,054,248 | 10/1977 | Beardmore | 239/88 |
| 4,213,434 | 7/1980 | Vogtmann et al. | 239/553.8 X |
| 4,269,360 | 5/1981 | Kopse | 239/533.8 |
| 4,552,310 | 11/1985 | Gaskell | 239/533.5 |
| 4,635,854 | 1/1987 | Ishibashi | 239/533.8 |
| 4,641,784 | 2/1987 | Howes | 239/533.8 X |
| 4,811,899 | 3/1989 | Egler | 239/5 |
| 4,840,310 | 6/1989 | Haider | 239/533.4 |
| 4,934,599 | 6/1990 | Hasagawa | 239/533.8 X |
| 4,986,472 | 1/1991 | Warlick et al. | 239/533.8 X |
| 5,121,730 | 6/1992 | Ausman et al. | 239/132 X |
| 5,143,291 | 9/1992 | Grinsteiner | 239/88 |
| 5,167,370 | 12/1992 | Henkel | 239/533.8 |

FOREIGN PATENT DOCUMENTS

| | | | |
|---|---|---|---|
| 3222861 | 10/1991 | Japan | 239/88 |
| 1227918 | 4/1971 | United Kingdom | 239/533.5 |
| 2140505 | 11/1984 | United Kingdom | 239/533.5 |

Primary Examiner—Andres Kashnikow
Assistant Examiner—Lesley D. Morris
Attorney, Agent, or Firm—Dykema Gossett

[57] ABSTRACT

A fuel injector nozzle and tip assembly comprises a check housing having a central axis and defining a cavity therealong with at least one spray orifice at a first end portion of the cavity and a control port of a smaller diameter than the cavity at a second end portion of the cavity. A discharge passage of the housing opens into the cavity at the first end portion. A needle check is disposed in the cavity and has an end portion operably engaging the first end portion of the cavity and operably blocking the orifice in a first position. A control port check is also disposed in the cavity for operable movement between a first position against the second end portion of the cavity blocking fluid flow through the control port and a second position spaced from the second end portion of the cavity permitting fluid flow through the control port. A biasing device is functionally disposed between the needle check and the control port check biasing the control port check and the needle check to their respective first positions.

6 Claims, 4 Drawing Sheets

INJECTION RATE SHAPING CONTROL PORTED CHECK STOP FOR A FUEL INJECTION NOZZLE

This is a continuation of application Ser. No. 08/220,854 filed on Mar. 31, 1994, now abandoned.

TECHNICAL FIELD

The present invention relates generally to fuel injectors for internal combustion engines. More particularly, this invention relates to improvements to nozzles of fuel injectors to provide fuel injection rate shaping.

BACKGROUND ART

Examples of fuel injection systems are shown in U.S. Pat. No. 4,527,738 issued to Martin on Jul. 9, 1985, U.S. Pat. No. 4,568,021 issued to Deckard, et al. on Feb. 4, 1986, and U.S. Pat. No. 5,213,083 issued to Glassey on May 25, 1993. During a fuel injection cycle or phase, fuel is forced from a fuel plunger chamber in which the pressure of the fuel is increased through one or more passages to a tip portion of a seated needle check blocking fuel flow through one or more fuel spray orifices. The pressurized fuel forces the needle check to move towards an unseated position uncovering the orifices and permitting the flow of fuel therethrough.

It is often desired to minimize the quantity of the fuel introduced into the combustion chamber early in an injection cycle so as to minimize engine combustion noise and/or emissions of nitrogen oxides ($NO_x$). Such a reduction in the quantity of fuel delivered is characterized as rate shaping of the fuel delivery. There are several known devices available which permit rate shaping of fuel delivery charges. It is desired to provide a compact and simplified rate shaping device that can be easily packaged within a fuel injector.

The present invention is directed to overcoming one or more of the problems as set forth above.

DISCLOSURE OF THE INVENTION

In one aspect of the present invention, a fuel injector nozzle and tip assembly is disclosed comprising a needle housing having a central axis and defining a cavity therealong. At least one spray orifice passes through the housing at a first end portion of the cavity. A control port of a smaller diameter than the cavity passes through the housing at a second end portion of the cavity. A discharge passage of the housing is generally parallel with the cavity and is fluidly connected to the cavity between the first end and the second end portions. A needle check is disposed in the cavity and has a point operably engaging the first end portion of the cavity and operably blocking the orifice in a first position. The needle check is sized to provide a close fitting sliding and radially sealing relationship with the cavity. A hat, also disposed in the cavity, operably moves between a first position against the second end portion of the cavity blocking fluid flow through the control port and a second position spaced from the second end portion of the cavity permitting fluid flow through the control port. A biasing means is functionally disposed between the needle check and the hat, biasing the hat and the needle check to their respective first positions. A pin member disposed in the cavity between the needle check and the hat has a length shorter than a distance between the biasing means reaction surface of the needle check in the first position and the hat in the first position.

The present invention provides a nozzle and tip assembly for a fuel injector with a biased hat providing injection rate shaping of the fuel charge which reduces the amount of fuel injected into the combustion chamber early in an injection cycle or phase.

THE BEST MODE FOR CARRYING OUT THE INVENTION

Figure 1:
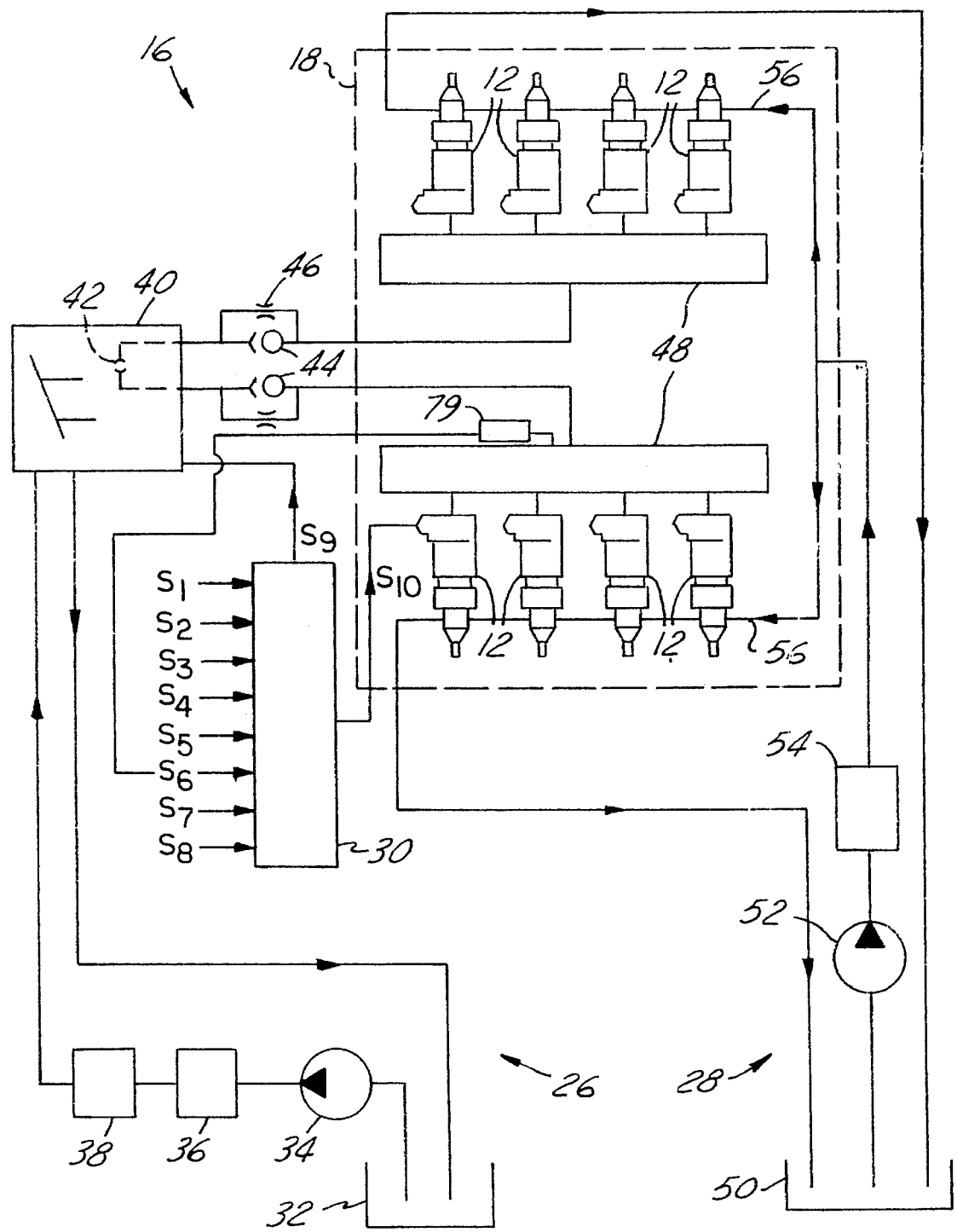
FIG. 1 is a schematic representation of a hydraulically-actuated electronically-controlled unit injector fuel system of the present invention, including both an actuating fluid circuit and a fuel injection circuit for an eight cylinder internal combustion engine having eight unit injectors.
Figure 2:
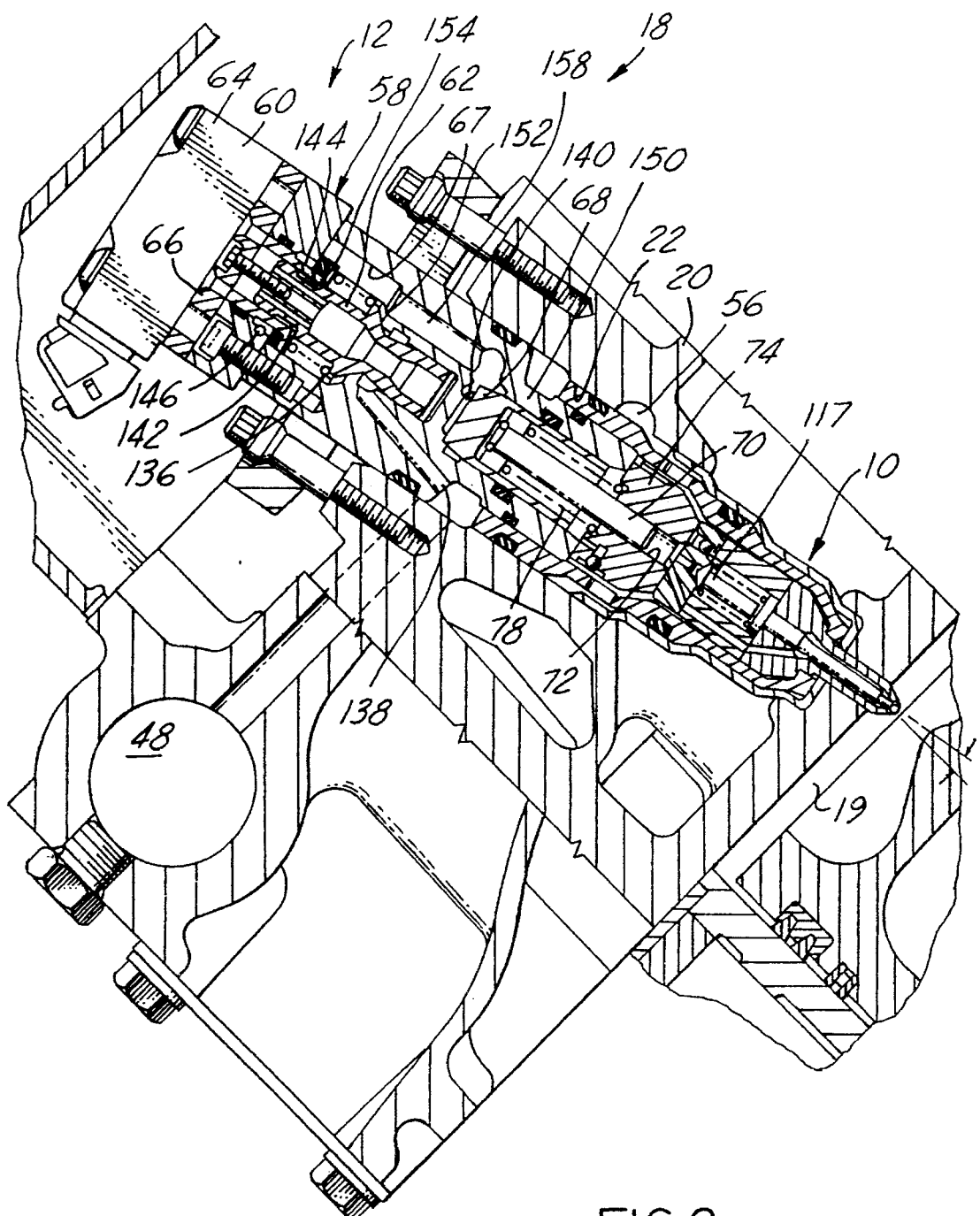
FIG. 2 is a diagrammatic partial cross-sectional view of one embodiment of a unit injector of FIG. 1 as installed in an exemplary internal combustion engine.
Figure 3:
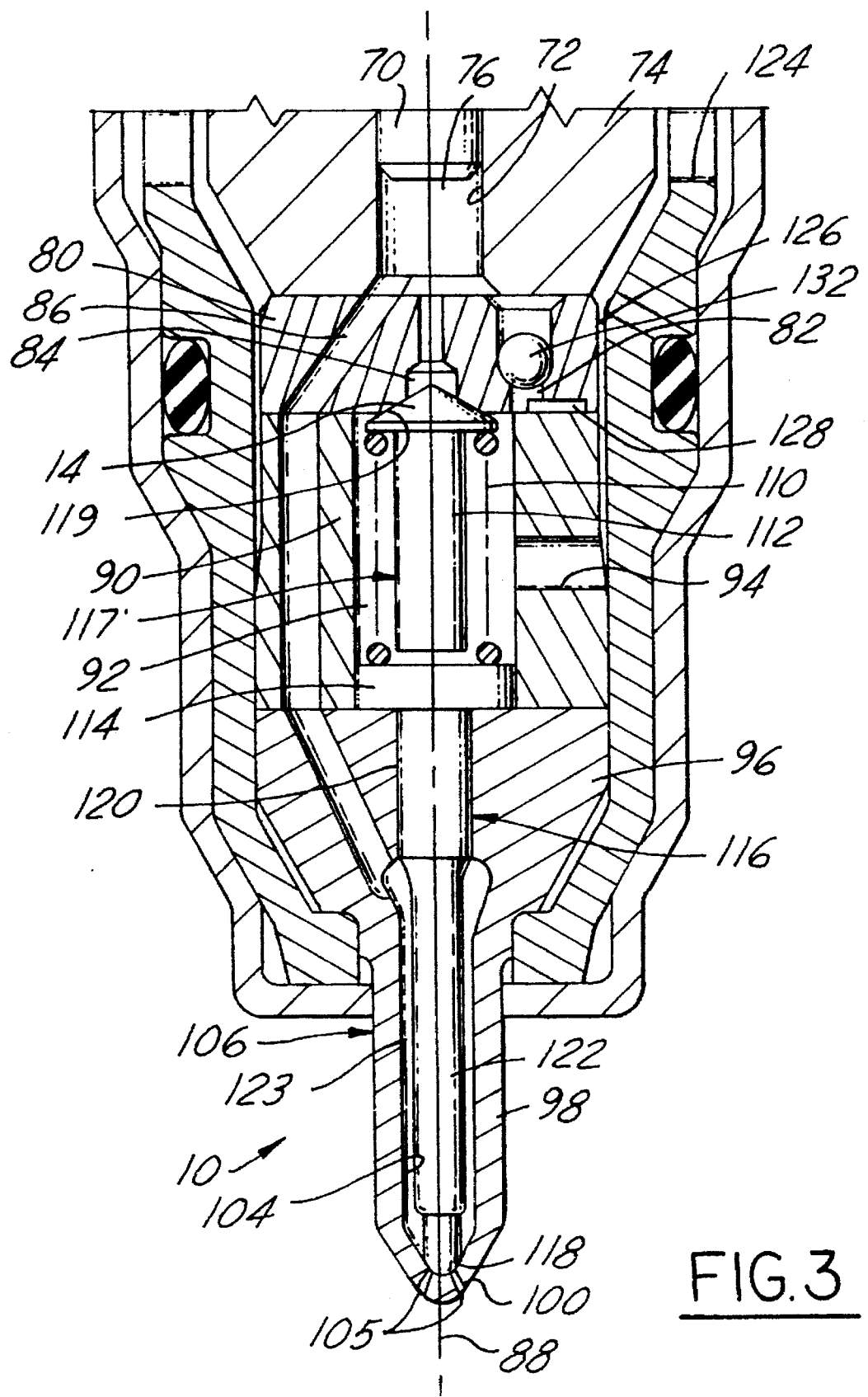
FIG. 3 is an enlarged view of a nozzle and tip assembly shown in FIG. 2.

Referring to FIGS. 1 through 5 wherein the same references numerals designate the same elements or features throughout all of FIGS. 1 through 5, a nozzle and tip assembly 10 of a fuel injector 12 has a control port check 14, or hat 14, as shown in FIGS. 2 and 3. While the unit injector 12, shown in FIGS. 1 through 3, is illustrated as a hydraulically-actuated electronically-controlled unit injector, it should be understood that the invention is also applicable to other types of fuel injectors, including, but not limited to, mechanically-actuated mechanically-controlled unit injectors, and injectors used in pump-line-nozzle fuel systems. The injector 12 is, for example, disposed in a hydraulically-actuated electronically-controlled injector system 16, hereinafter referred to as the HEUI fuel injector system. The unit injectors 12 are shown in FIG. 1 as being employed with a diesel-cycle direct-injection internal combustion engine 18. While a V-type eight cylinder engine is illustrated in FIG. 1 and described herein, it should be understood that the invention is also applicable to other types of engines, such as in-line cylinder engines and rotary engines, and that the engine may contain fewer or more than eight cylinders or combustion chambers 19. The exemplary engine 18, only partially shown in FIG. 2, has a pair of cylinder heads 20. Each cylinder head 20 has one or more unit injector bores 22 with four being provided here. The following description will first describe the elements and operation of the HEUI system 16 and then will describe in more detail specifics of the inventive embodiments of the nozzle and tip assembly 10.

Referring to FIGS. 1 and 2, the HEUI fuel injection system 16 preferably includes one or more hydraulically-actuated electronically-controlled unit injectors 12 adapted to be positioned in a respective unit injector bore 22, means or device 26 for supplying hydraulic actuating fluid and damping fluid to each unit injector 12, means or device 28 for supplying fuel to each unit injector, and means or device 30 for electronically controlling the HEUI fuel system 16 such as an electronic control module 30. While unit injectors 12 are preferred in this embodiment, other applications might be better served by non-unitized injectors (e.g., injectors used in pump-line-nozzle fuel systems).

The means or device 26 for supplying hydraulic actuating fluid and damping fluid to each unit injector includes a sump 32 and a low pressure transfer pump 34 which draws fluid from the sump 32. The device 26 also includes a cooler 36, a filter 38 and a high pressure pump 40 with an integrated pressure control system, through which hydraulic actuating fluid from the low pressure transfer pump 34 is passed. The high pressure pump 40 varies an output pressure of fluid from an output port 42 of the high pressure pump 40 in response to a signal S9 from the electronic control module (ECM) 30. The signal S9 from the ECM 30 is determined as a function of one or more input signals S1 through S8 indicative of a plurality of system parameters.

Hydraulic actuating fluid passes from the output port 42 of the pump to check valves 44. The check valves 44 are in parallel with orifices 46. Hydraulic actuating fluid passes from the check valves 44 to hydraulic actuating fluid manifolds 4S. Hydraulic actuating fluid within the manifold 48 enters the unit fuel injectors 12.

The means or device 28 for supplying fuel includes a fuel tank 50 and a transfer pump 52 removing fluid therefrom and passing it through a conditioning means 54, also part of the fuel supplying device 28. Fuel passes from the conditioning means 54 into fuel manifolds 56 and to the respective banks of unit injectors 12. Fuel is supplied to the fuel manifolds 56 and injectors 12 at a relatively low pressure (for example, about 276 to 413 kPa or 40 to 60 psi).

An actuator and valve assembly 58 of each unit injector 12 as shown in FIG. 2 is provided as a means or device for selectively communicating either high pressure actuating fluid or low pressure damping fluid to each unit injector 12 in response to receiving an electronic fuel delivery command signal S10. The actuator and valve assembly 58 includes an actuator 60, preferably in the form of a solenoid assembly 60, and a valve 62, preferably in the form of a popper valve 62. The solenoid assembly 60 includes a fixed stator assembly 64 and a movable armature 66. The poppet valve is disposed in a body bore chamber 67.

The unit injector 12 has an intensifier piston 68 and an associated fuel pumping plunger 70 which may be either a separate component or integral with the piston 68. The plunger 70 extends into a bore 72 of a barrel 74, defining a fuel pump, or plunger chamber 76 therein. A plunger spring 78 is disposed between the intensifier piston 68 and the barrel 74, circumscribing the plunger 70.

The ECM 30 receives input data signals from one or more signal indicating devices, for example, eight signal indicating devices providing signals S1 through S8. Input data signals may include engine speed S1, engine crankshaft position S2, engine coolant temperature S3, engine exhaust back pressure S4, air intake manifold pressure S5, hydraulic actuating fluid manifold pressure S6, throttle position or a desired fuel setting S7, and transmission operating condition indicative signal S8, which, for example, may indicate the gear setting of the transmission. The output control signal S9 is the actuating fluid manifold pressure command signal directed to the high pressure pump which is an element of the device 26 for supplying hydraulic actuating fluid. A pressure transducer 79 for providing signal S6 is shown in FIG. 1.

Referring to FIG. 3, the nozzle and tip assembly 10 includes a stop 80 which abuts the barrel 74 on a side opposite the plunger 70 and piston 68. The stop 80 defines a fuel inlet passage 82, a control port 84, and a discharge passage 86. All three elements 82, 84, 86 are fluidly connected on one end portion to the fuel plunger chamber 76 of the barrel 74. The control port 84 is preferably centered on a central longitudinal axis 88 along which the plunger 70 and piston 68 reciprocate.

A sleeve 90 abuts the stop 80 opposite the barrel 74. The sleeve 90 defines a spring chamber 92 parallel to the axis 88, a continuation of the discharge passage 86 within a wall of the sleeve 90 and approximately parallel to the axis 88, and an exhaust port 94 passing through the sleeve 90 normal to the axis 88.

A needle check tip 96 abuts the sleeve 90 opposite the stop 80. The needle check tip 96 has an elongated reduced diameter stem portion 98 centered on the axis 88. An end 100 of the stem portion 98 is disposed opposite the sleeve 90. The needle check tip 96 defines both an extended blind bore 104 along the axis 88 toward the end 100 of the stem portion 98, and a further continuation of the discharge passage 86. The spring chamber 92 of the sleeve 90 and the bore 104 of needle check tip 96 together comprise a continuous cavity, with a first end portion positioned at the end 100 of the needle check tip and a second end portion positioned at the stop 80. One or more fuel injection spray orifices 105 pass through the end 100 into the extended blind bore 104. The discharge passage 86 in the needle check tip 96 is fluidly connected with the blind bore 104. Together, the stop 80, the sleeve 90, and the needle check tip 96 form a needle housing 106 in which are disposed the control port check 14, a spring 110, a pin 112, a spacer 114, and a check 116.

In the present embodiment, the pin 112 is fixed to the control port check 14 for movement therewith. The unitary control port check 14 and pin 112 can be characterized as a rate shaping valve 117 with the control port check 14 and the pin 112 forming first and second portions thereof respectively. The control port check 14 is preferably conical in shape for seating against a complementarily shaped seat 119 of the control port 84. The check 116 has a tapered portion 118 for seating within the end portion 100 of the needle check tip 96 and is large enough to block fluid communication between the discharge passage 86 and the orifices 105. The spacer 114 rests against the check 116 in the spring chamber 92 and provides a spring reaction surface directed toward the hat 14. The spring 110 is disposed between the spacer 114 and the control port check 14, biasing the port check 14 and the check 116 to closed positions in which they stop, or block, the control port 84 and orifices 105, respectively. In one alternative embodiment, the pin 112 is separate from the port check 14, and is disposed in parallel with the spring between the port check 14 and the spacer 114. In another alternative embodiment, the pin 112 is fixed to the spacer 114 for movement therewith.

The needle check 116 has two portions. A guide portion 120 distal to the point 118 is sized to provide a close fitting sliding and radially sealing relationship with the bore 104. An end portion 122 smaller in diameter than the guide portion 120 extends from the guide portion 120 and is inclusive of the tapered portion 118. The discharge passage 86 Joins an annular discharge passage 123 defined by the bore 104 and the end portion 122 of the needle check 116. A Junction between the two 86 and 123 is preferably characterized by a cardioid chamber approximately aligned with a transition in the check 116 from the guide portion 120 to the end portion 122. A portion of the bore 104 between the cardioid chamber and the end portion 100 can be varied in diameter independent of a diameter of the bore 104 opposite the cardioid in which the guide portion 120 of the check 116 is disposed.

The HEUI system operates in the following manner. Referring to FIGS. 2 and 3, the low pressure fuel from the fuel manifold 56 flows through case fuel inlet holes 124, an annular passage 126, a close-clearance passage 128 such as an edge filter, and then the fuel inlet passage 82. The relatively low pressure fuel unseats a check valve 132 disposed in the inlet passage 82 when the pressure in the fuel plunger chamber 76 is lower than the pressure upstream of the check valve 132 by a selected amount. While the check valve 132 is unseated, the fuel plunger chamber 76 is refilled with fuel.

While the solenoid assembly 60 is in its de-energized state, the poppet valve 62 is biased to a first or noninjection position by a popper spring 136, blocking fluid communication between an actuating fluid inlet passage 138 and a piston pump chamber 140 while opening communication between the piston pump chamber 140 and an upper annular peripheral groove 142, a connector passage 144, and a drain passage 146 that communicate with the actuating fluid sump 32. With negligible fluid pressure in the piston pump chamber 140, the plunger spring 78 pushes upwardly against the plunger 70 and intensifier piston 68 seating the piston against a valve body 150.

The HEUI system allows an injection start point, an injection stop point, and the injection pressure to all be regulated independent of engine speed and load. The quantity of fuel delivered can consequently be varied independent of engine speed and load.

In order to start injection independent of engine speed and load, a fuel delivery command signal S10 is emitted by the ECM 30 and delivered to an electronic drive unit (not shown). The electronic drive unit generates a preselected wave form which is conducted to the solenoid assembly 60 of a selected unit injector 12. The solenoid assembly 60 is electrically energized so that the armature 66 is magnetically drawn toward the stator 64. The poppet valve 62 is also pulled by the moving armature 66. The poppet valve 62 moves to a second or injection position where a lower seat 152 of the poppet valve 62 provides fluid communication between the inlet passage 138 and the piston pump chamber 140 while an upper seat 154 blocks fluid communication between the piston pump chamber 140 and an annular body bore chamber 67, and the drain passage 146. Hydraulic actuating fluid at a relatively high pressure (for example, about 23 MPa or 3335 psi) flows through the inlet passage 138, the annular body bore chamber 67, an intermediate passage 158 and into the piston pump chamber 140, thereby hydraulically exerting a driving force on the intensifier piston 68.

The high pressure actuating fluid displaces the intensifier piston 68 and plunger 70 in opposition to the force generated by the compressed plunger spring 78 and fuel pressure. The fuel in the fuel plunger chamber 76 is pressurized to a level which is a function of the pressure of the actuating fluid in the intensifier piston pump chamber 140 and the ratio of effective areas A1/A2 between the intensifier piston 68 and the plunger 70. This pressurized fuel flows from the fuel plunger chamber 76 and through the discharge passage 86 to the annular discharge passage 123 where it acts on the needle check 116 in opposition to a force exerted by the needle check spring 110. The pressurized fuel lifts the needle check 116 after a selected pressure level is reached and the highly pressurized fuel passes through the spray orifice a 105 for the start of injection into the combustion chamber.

In order to end injection, or control the quantity of fuel injected independent of engine speed and load, the ECM 30 discontinues its fuel delivery command signal S10 to the electronic drive unit. The electronic drive unit then discontinues its wave form, thereby electrically de-energizing the solenoid assembly 60 of the selected unit injector 12. The absence of the magnetic force allows the compressed popper spring 136 to expand causing both the armature 66 and the poppet valve 62 to move back to their first positions.

Industrial Applicability

Fuel in the fuel plunger chamber 76, the control port 84, the discharge passage 86, and the annular discharge passage 123 is at essentially the same pressure. At low pressure, the spring 110 maintains both the needle check 116 and the rate shaping valve 117 at a seated or first position. When the intensifier piston 68 is exposed to high pressure actuating fluid, the plunger 70 is forced toward the stop 80 thereby increasing the pressure of the fuel within the nozzle and tip assembly 10. The pressurized fuel acts on a first apply area of the check. The first apply area is approximately equal to the cross-sectional area of the extended blind bore 104 minus the seating (i.e. unexposed) area of the seated check portion 118. Fluid pressure against the needle check 116 displaces it and the spacer 114 upward against the force of the spring 110. Fuel pressure simultaneously acts through the control port 84 against an initial second apply area of the rate shaping valve 117 to unseat the rate shaping valve 117 from the stop 80 by overcoming the spring 110. The initial second apply area is equal to the cross-sectional area of the control port 84 adjacent to the control port check 14. The first apply area is initially slightly larger than the initial second apply area, causing the check 116 to be unseated before the rate shaping valve 117 is unseated. Fuel flows from the fuel plunger chamber 76 through the discharge passage 86 and into the annular discharge passage 123 where a portion of the fuel is sprayed through the orifices 105 and into the combustion chamber 19. The remainder of the fuel from the discharge passage 86 backfills the annular discharge passage 123 as the check 116 is displaced axially toward the pin 112. Fuel passing through the control port 84 moves past the rate shaping valve 117 into the spring chamber 92 and through the exhaust port 94 into equilibrium with the low pressure fuel. The spacer 114 then contacts the pin 112 of the valve 117. Note that once the needle check 116 is displaced from its seated position, the first apply area increases so that it is approximately equal to the cross-sectional area of the bore 104. Thus, the first apply area has become significantly larger than the second apply area even through the second apply area slightly increased when the valve 117 unseated. Therefore, continued axial displacement of the check 116 forces the rate shaping valve 117 into its seat, thereby reducing and terminating fuel flow therepast. The balance of the fuel discharge from the fuel plunger chamber 76 is exclusively through the spray orifices 105 by way of the discharge passage 86 and the annular discharge passage 123.

Figure 4:
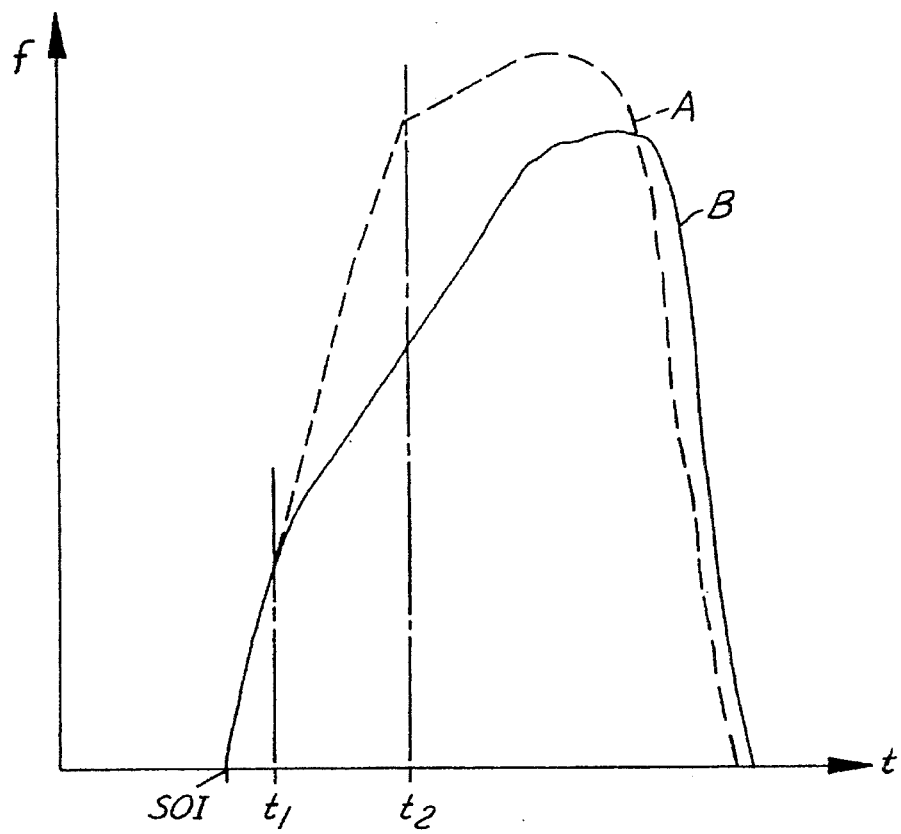
FIG. 4 is plot of fuel discharge as a function of time.

The flow of fuel past the rate shaping valve 117 gives the present invention its rate shaping characteristic. FIG. 4 shows plots of fuel discharge f into a combustion chamber as a function of time t. The plots show fuel discharge both with and without the benefit of fuel injection rate shaping as provided by the control port 84 and the control port check 14. Line A of FIG. 4, shown as a hashed line, shows the fuel discharge without the benefit of a control port stop. Line B, which is shown as a solid line, represents the discharge into a combustion chamber which would be expected with an injector having a control port stop as described in the present invention. It is readily evident that the rate shaping decreases the amount of fuel injected into the combustion chamber early in the injection cycle. Start-of-injection or SOI is the point in time where the check unseats and injection starts.

Time $t_1$ is the point in time where the rate shaping valve 117 unseats and rate shaping begins. Time $t_2$ is where the hat is returned to its seat.

Figure 5:
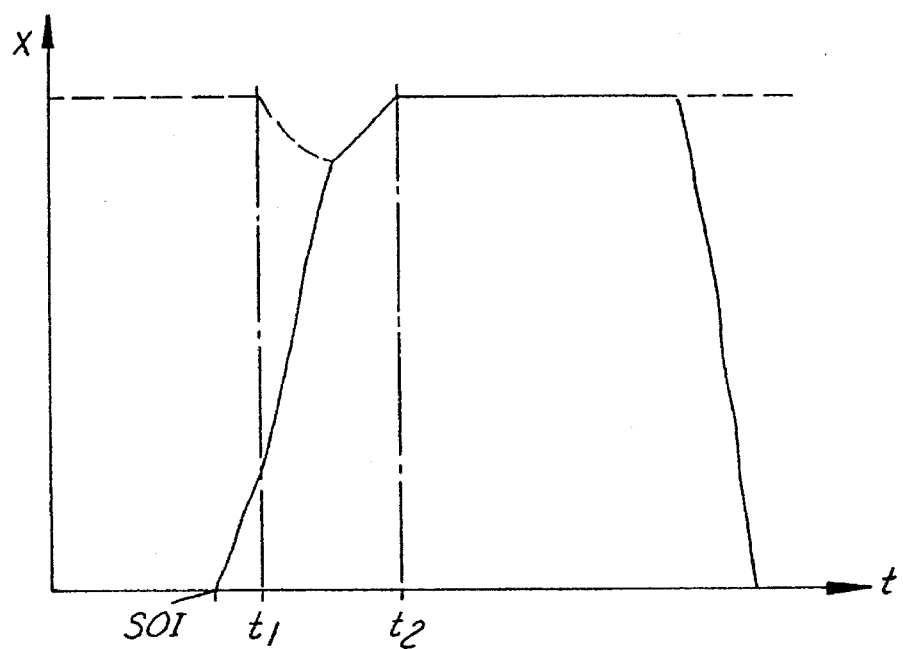
FIG. 5 is a plot of displacement of the check and displacement of the hat as a function of time.

FIG. 5 is a plot showing displacement x of the needle check 116 and displacement x of the control port check 14 as a function of time t during an injection cycle. Displacement of the rate shaping valve 117 is shown as a hashed line. Displacement of the check 116 is shown as a solid line.

Other aspects, objects, and advantages of this invention can be obtained from a study of the drawings, the disclosure, and the appended claims.

I claim:

1. A nozzle and tip assembly adapted for a fuel injector comprising:
   a needle housing defining an internal cavity and at least one spray orifice;
   a movable check disposed in the internal cavity and operably blocking at least one spray orifice;
   a stop fixed relative to the housing defining a control port; and
   a rate shaping valve disposed between the check and the stop and reciprocal between a first position wherein the valve is seated in the control port thereby limiting check travel and a second position wherein the valve is spaced from the control port permitting fuel flow therethrough, thereby decreasing a quantity of fuel injected through the at least one orifice early in an injection cycle.

2. A nozzle and tip assembly adapted for a fuel injector comprising:
   a check housing having a central axis and defining an internal cavity therealong, and defining at least one spray orifice through the housing at a first end portion of the cavity, and defining a control port seat and a control port of a smaller diameter than the cavity at a second end portion of the cavity, and defining a discharge passage adapted to fluidly connect the cavity to a first end portion of a fuel pump chamber;
   a check disposed within the cavity and sized to provide a close fitting sliding and radially sealing relationship with the cavity and having a portion directed toward the at least one orifice and blocking the at least one orifice in a first position;
   a rate shaping valve having first and second end portions, said rate shaping valve disposed within the cavity and movable between a first position wherein the first end portion of the rate shaping valve abuts against the second end portion of the cavity thereby blocking fluid flow through the control port and a second position wherein the first end portion of the rate shaping valve is spaced from the second end portion of the cavity thereby permitting fluid flow through the control port;
   means for biasing the first end portion of the rate shaping valve and the check to their respective first positions wherein said biasing means is functionally disposed between the check and the rate shaping valve; and
   said second end portion of the rate shaping valve disposed in the cavity between the check and the first end portion of the rate shaping valve, said second end portion having a length shorter than a distance between the check and the first end portion of the rate shaping valve in their respective first positions, thereby limiting relative movement therebetween, wherein the rate shaping valve is displaced by the check as the check moves to a second position in which the first end portion of the rate shaping valve is held against the control port seat.

3. The nozzle and tip assembly of claim 2, wherein the check housing comprises:
   a stop providing the second end portion of the cavity and defining the control port and a first part of the discharge passage;
   a sleeve defining a continuation of the discharge passage from the stop and a biasing chamber of the cavity in which the biasing means is disposed and an exhaust port passing through the sleeve normal to the spring chamber; and
   a check tip defining a further continuation of the discharge passage and an extended blind bore of the cavity and the at least one orifice disposed at an end of the extended blind bore.

4. The nozzle and tip assembly of claim 3, wherein the check comprises a guide portion distal to the point and sized to provide a close fitting sliding and radially sealing relationship with the extended blind bore and an end portion smaller in diameter than the guide portion and extending from the guide portion and inclusive of the point.

5. The nozzle and tip assembly of claim 2, further comprising a spacer disposed between the needle check and the spring member.

6. A nozzle and tip assembly adapted for a fuel injector unit, comprising:
   a check housing defining an internal cavity and at least one spray orifice;
   a check disposed in the internal cavity and having an end portion operably blocking the at least one spray orifice;
   a reciprocal plunger defining a fuel plunger chamber fluidly connected with the end portion of the check;
   a stop fixed relative to the check housing which defines a control port therein fluidly connected to the fuel plunger chamber; and
   a valve having a first position seated in the control port to limit check movement and having a second position spaced from the control port to allow fuel to flow therepast from the fuel plunger chamber, thereby decreasing the initial rate of fuel injection through the at least one orifice by diverting fuel therefrom.

* * * * *